US011132777B2

(12) United States Patent
Derakhshani et al.

(10) Patent No.: US 11,132,777 B2
(45) Date of Patent: *Sep. 28, 2021

(54) SPECULAR REFLECTION REDUCTION USING POLARIZED LIGHT SOURCES

(71) Applicant: Advanced New Technologies Co., Ltd., Grand Cayman (KY)

(72) Inventors: Reza R. Derakhshani, Kansas City, MO (US); Raghunandan Pasula, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/129,472

(22) Filed: Dec. 21, 2020

(65) Prior Publication Data

US 2021/0110523 A1  Apr. 15, 2021

Related U.S. Application Data

(63) Continuation of application No. 16/795,271, filed on Feb. 19, 2020, now Pat. No. 10,872,402, which is a
(Continued)

(51) Int. Cl.
*G06T 5/50* (2006.01)
*G06F 21/32* (2013.01)
(Continued)

(52) U.S. Cl.
CPC .............. *G06T 5/50* (2013.01); *G06F 21/32* (2013.01); *G06K 9/2027* (2013.01);
(Continued)

(58) Field of Classification Search
CPC .. H04N 13/363; H04N 13/332; H04N 5/2256; H04N 5/2354; H04N 13/282;
(Continued)

(56) References Cited

U.S. PATENT DOCUMENTS

| 6,088,612 A | 7/2000 | Blair |
| 7,158,099 B1 | 1/2007 | Berube et al. |

(Continued)

FOREIGN PATENT DOCUMENTS

WO   WO 2016131075   8/2016

OTHER PUBLICATIONS

PCT International Preliminary Report on Patentability in International Application No. PCT/US2018/059171, dated Feb. 3, 2020, 25 pages.

(Continued)

*Primary Examiner* — Jingge Wu
(74) *Attorney, Agent, or Firm* — Fish & Richardson P.C.

(57) ABSTRACT

A method for generating a composite image includes receiving a first image that includes an eyeglass lens illuminated by a first illumination source radiating electromagnetic radiation in a first polarization state, and receiving a second image that includes the eyeglass lens illuminated by a second illumination source radiating electromagnetic radiation in a second polarization state. The second polarization state is different from the first polarization state, and the second illumination source is spatially separated from the first illumination source. The method also includes identifying, in the first image, a first portion that represents a reflection of the first illumination source on the eyeglass lens, and generating the composite image in which the first portion is replaced by a corresponding second portion from the second image. The first portion and the second portion represent substantially a same portion of the eyeglass lens.

20 Claims, 5 Drawing Sheets

Related U.S. Application Data continuation of application No. 16/368,385, filed on Mar. 28, 2019, now Pat. No. 10,878,548.

(51) Int. Cl.

| | |
|---|---|
| *H04N 5/235* | (2006.01) |
| *G06K 9/46* | (2006.01) |
| *G06K 9/20* | (2006.01) |
| *G06K 9/00* | (2006.01) |

(52) U.S. Cl.
CPC ......... *G06K 9/4661* (2013.01); *H04N 5/2354* (2013.01); *G06K 9/00221* (2013.01); *G06K 9/00604* (2013.01); *G06T 2207/10152* (2013.01); *G06T 2207/20221* (2013.01); *G06T 2207/30201* (2013.01)

(58) Field of Classification Search
CPC .............. G01N 2201/063; G06F 21/32; G06K 9/2027; G06K 9/4661; G06T 3/4038; G06T 5/50
See application file for complete search history.

(56) References Cited

U.S. PATENT DOCUMENTS

| | | | |
|---|---|---|---|
| 10,554,918 | B1 | 2/2020 | Derakhshani |
| 10,872,402 | B2 * | 12/2020 | Pasula .................. H04N 5/2354 |
| 10,878,548 | B2 * | 12/2020 | Pasula ...................... G06T 5/50 |
| 2003/0169334 | A1 | 9/2003 | Braithwaite et al. |
| 2007/0132953 | A1 | 6/2007 | Silverstein |
| 2009/0002774 | A1 | 1/2009 | King et al. |
| 2009/0213130 | A1 | 8/2009 | Onodera et al. |
| 2010/0157100 | A1 | 6/2010 | Roquemore, III |
| 2011/0164221 | A1 | 7/2011 | Tilleman et al. |
| 2013/0215401 | A1 * | 8/2013 | Inoko ....................... F21V 5/04 353/102 |
| 2014/0049451 | A1 | 2/2014 | Sugiyama et al. |
| 2015/0271380 | A1 | 9/2015 | Darty et al. |
| 2015/0381871 | A1 | 12/2015 | Makino |
| 2016/0084751 | A1 | 3/2016 | Levitz et al. |
| 2016/0088291 | A1 | 3/2016 | Coni et al. |
| 2016/0125583 | A1 | 5/2016 | Amanullah et al. |
| 2016/0266428 | A1 | 9/2016 | Li et al. |
| 2016/0278632 | A1 * | 9/2016 | Saito ................. G02B 27/0068 |
| 2016/0373731 | A1 | 12/2016 | Smoot et al. |
| 2017/0091548 | A1 | 3/2017 | Agrawal et al. |
| 2017/0176336 | A1 | 6/2017 | Dimitriadis et al. |
| 2017/0280995 | A1 * | 10/2017 | Yates .................... A61B 3/125 |
| 2018/0139365 | A1 | 5/2018 | Kanamori et al. |
| 2019/0139206 | A1 | 5/2019 | Derakhshani |
| 2019/0159673 | A1 | 5/2019 | Yates et al. |
| 2019/0266398 | A1 | 8/2019 | Kanamori |
| 2019/0380576 | A1 | 12/2019 | Ranchod et al. |
| 2020/0029808 | A1 | 1/2020 | MacDougall et al. |

OTHER PUBLICATIONS

PCT International Search Report and Written Opinion in International Application No. PCT/US2018/059171, dated Feb. 18, 2019, 15 pages.

PCT Written Opinion of the International Preliminary Examining Authority in International Application No. PCT/US2018/059171, dated Oct. 10, 2019, 4 pages.

U.S. Appl. No. 16/368,385, filed Mar. 28, 2019, Raghunandan Pasula.

U.S. Appl. No. 16/795,271, filed Feb. 19, 2020, Raghunandan Pasula.

\* cited by examiner

SPECULAR REFLECTION REDUCTION USING POLARIZED LIGHT SOURCES

CROSS-REFERENCE TO RELATED APPLICATIONS

This application is a continuation of and claims the benefit of priority of U.S. patent application Ser. No. 16/795,271, filed Feb. 19, 2020, which is a continuation of and claims the benefit of priority of U.S. patent application Ser. No. 16/368,385, filed Mar. 28, 2019, and each application is hereby incorporated by reference in its entirety.

TECHNICAL FIELD

This disclosure relates to image capture devices.

BACKGROUND

Systems incorporating a biometric identification technology such as face recognition or iris recognition often include a camera that captures an image of a user. The captured image is then processed to authenticate the user using the biometric identification technology.

SUMMARY

In one aspect, this document describes a method for generating a composite image from multiple images. The method includes receiving, at one or more processing devices, a first image that includes an eyeglass lens. The eyeglass lens is illuminated by a first illumination source radiating electromagnetic radiation in a first polarization state. The method also includes receiving, at the one or more processing devices, a second image that includes the eyeglass lens, wherein the eyeglass lens is illuminated by a second illumination source radiating electromagnetic radiation in a second polarization state. The second polarization state is different from the first polarization state, and the second illumination source is spatially separated from the first illumination source. The method also includes identifying, in the first image, a first portion that represents a reflection of the first illumination source on the eyeglass lens, and generating the composite image in which the first portion is replaced by a corresponding second portion from the second image. The first portion and the second portion represent substantially a same portion of the eyeglass lens.

In another aspect, this document describes an imaging system that includes a first illumination source controllable to radiate electromagnetic radiation of multiple polarization states, and a second illumination source disposed spatially separated from the first illumination source, the second illumination source controllable to radiate electromagnetic radiation of multiple polarization states. The system also includes one or more processing devices that receive a first image captured under illumination by the first illumination source radiating electromagnetic radiation in a first polarization state, and receive a second image under illumination by a second illumination source radiating electromagnetic radiation in a second polarization state different from the first polarization state. The one or more processing devices also identify, in the first image, a first portion that represents a reflection of the first illumination source, and generate a composite image in which the first portion is replaced by a corresponding second portion from the second image. The first portion and the second portion represent substantially a same portion of a subject captured in the first and second images.

In another aspect, this document describes one or more machine-readable storage devices having encoded thereon computer readable instructions for causing one or more processing devices to perform operations. The operations include receiving a first image that includes an eyeglass lens. The eyeglass lens is illuminated by a first illumination source radiating electromagnetic radiation in a first polarization state. The operations also include receiving a second image that includes the eyeglass lens, wherein the eyeglass lens is illuminated by a second illumination source radiating electromagnetic radiation in a second polarization state. The second polarization state is different from the first polarization state, and the second illumination source is spatially separated from the first illumination source. The operations further include identifying, in the first image, a first portion that represents a reflection of the first illumination source on the eyeglass lens, and generating the composite image in which the first portion is replaced by a corresponding second portion from the second image. The first portion and the second portion represent substantially a same portion of the eyeglass lens.

Implementations of any of the above aspects can include one or more of the following features.

The first illumination source can radiate the electromagnetic radiation in the first polarization state during a first time period, and the second illumination source can radiate the electromagnetic radiation in the second polarization state during a second time period that is at least partially non-overlapping with the first time period. The first polarization state can be substantially orthogonal to the second polarization state. A biometric authentication can be performed based on the composite image. In some implementations, a third portion that represents a reflection of the second illumination source on the eyeglass lens can be identified in a second image, and a second composite image can be generated. In the second composite image, the third portion can be replaced by a corresponding fourth portion from the first image, the third portion and the fourth portion representing substantially a same portion of the eyeglass lens. At least one of: (i) a first polarizer disposed at the first illumination source and (ii) a second polarizer disposed at the second illumination source can be controlled such that the reflection of the first illumination source on the eyeglass lens and a reflection of the second illumination source on the eyeglass lens are at different locations. At least one of (i) the first polarization state and (ii) the second polarization state can be adjusted based on an estimate of a strength of reflection associated with the reflection of the first illumination source on the eyeglass lens.

At least one camera can be used in capturing the first and second images. An authentication engine can process the composite image to perform a biometric authentication process to regulate access to a secure system. A first polarizer can be disposed at the first illumination source and/or a second polarizer disposed at the second illumination source. At least one motor can control one or more of the first and second polarizers such that the reflection of the first illumination source on the subject and a reflection of the second illumination source on the subject are at different locations. At least one of (i) the first illumination source and (ii) the second illumination source can be a multispectral source controllable to radiate illumination at multiple different wavelengths. A wavelength associated with at least one of (i) the first illumination source and (ii) the second illumination source can be adjusted based on an estimate of a strength of reflection associated with the reflection of the first illumination source.

Various implementations described herein may provide one or more of the following advantages. By using at least two spatially separated illumination sources that generate illumination in different polarization states, camera sensors can be used to obtain at least two separate images where the differently polarized illumination sources are reflected differently. This in turn may be used to generate a composite image by replacing a portion of a first image affected by specular reflection from a first illumination source by a corresponding portion from a second image which is not affected similarly by the first illumination source. This in turn can potentially improve the underlying biometric authentication systems and/or the usability of such systems in various applications particularly in processing images of users wearing eyeglasses. For example, the technologies described herein may improve the performance of a biometric authentication/identification/verification system by making available important eye or facial features that may otherwise not be discernible in an image due to reflections of a light source on an eyeglass lens or glare on the eyeball due to ambient lighting conditions.

Repeat use of reference characters in the present specification and drawings is intended to represent same or analogous features or elements.

DETAILED DESCRIPTION

This document describes technology that allows for removing reflections (e.g., specular reflections) from images captured in the presence of one or more artificial illumination sources such as light emitting diode (LED) lights. Various biometric identification/authentication systems are based on capturing one or more images, which are then compared with or analyzed with reference to template images captured during an enrollment process. For example, a biometric authentication system that uses face identification may require enrolling users to pose for one or more images of their face during an enrollment process. The images captured during the enrollment process may be stored on a storage device accessible to the biometric authentication system. During run-time, a facial image of a user can be captured and compared with one or more template images to determine if the user may be identified/verified. The run-time images may be captured using one or more artificial illumination sources, which in turn may produce specular reflections of the illumination sources on the subject, e.g., on the lenses of eyeglasses worn by the subject. In some cases, such specular reflections may be detrimental to the underlying biometric authentication process, for example, by occluding eye or facial features that may otherwise be used by the process. In some cases, this may affect the accuracy and/or efficiency of the underlying biometric authentication system, for example by adversely affecting the false positive and/or the false negative rates.

The technology described herein allows for mitigating adverse effects of specular reflections on biometric authentication processes via the generation of a composite image from multiple images that are captured under differently polarized illumination. For example, the polarization states of multiple spatially separated illumination sources may be varied (e.g., by controlling polarization angles of polarizers disposed in front of the individual sources) such that the individual light sources radiate light that are differently polarized. Because lights of different polarization states reflect off a surface differently, specular reflections due to two spatially separated light sources polarized in different ways are likely to appear in two different locations. If multiple images of the subject are captured under illumination of different polarization states, portions of one image that is affected by specular reflection due to one source may be replaced by corresponding portions from another image captured under illumination by another source. It could also be used to mitigate the glare on the surface of the eyeball due to light source or ambient lighting conditions. Other similar conditions include minimizing the specular reflections on reflective surface of the skin such as sweaty/oily forehead and lower periocular region etc.

When used in subsequent biometric processing, such composite images may improve the accuracy and/or efficiency of the underlying biometric authentication technology. Multiple images captured under illumination by different spatially-separated light sources may be used to generate a 3D representation of the target using photometric stereo reconstruction techniques. Such 3D representations may in turn be used in spoof-detection, for example, by differentiating from 2D images of the same target.

Figure 1:
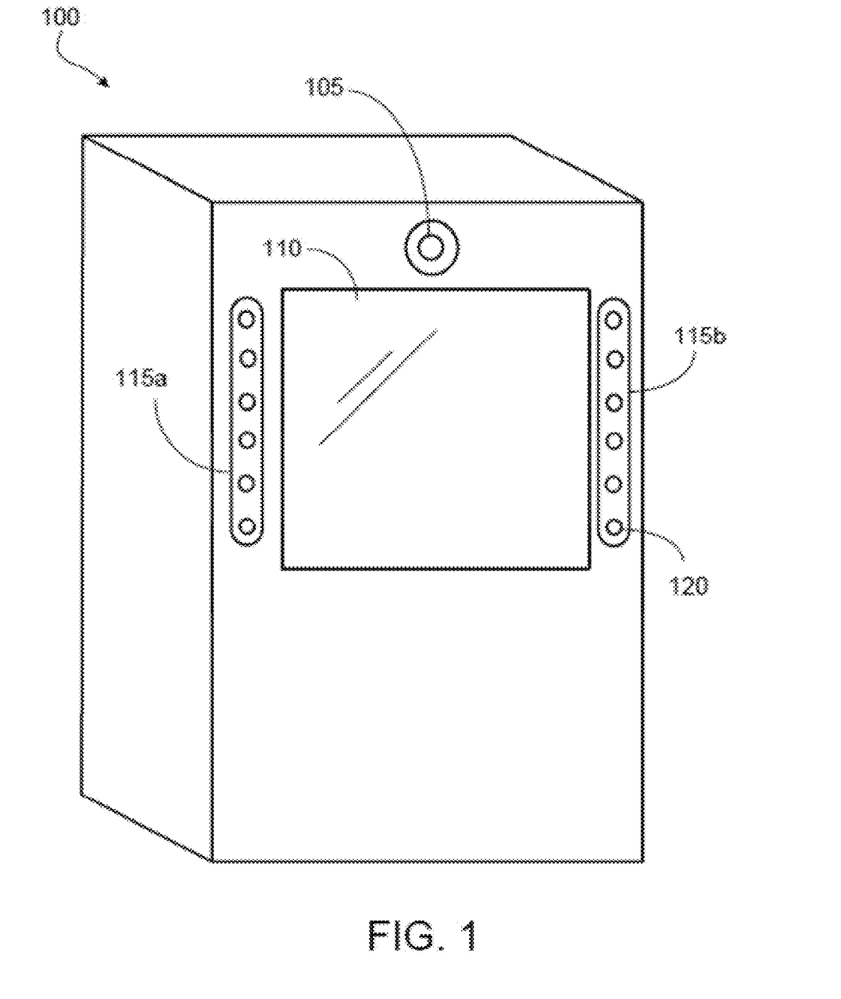
FIG. 1 shows a kiosk machine as an example environment in which the technology described herein may be used.

FIG. 1 shows a kiosk machine 100 as an example environment in which the technology described herein may be used. Such kiosk machines may be used for various purposes that require identifying/verifying users via one or more biometric authentication processes. For example, the kiosk 100 can include an ATM that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to identify/verify entrants prior to entering the venue. In general, the kiosk 100 may be deployed at various types of locations to identify/verify users interactively, or even without any active participation of the user.

In some implementations, the kiosk 100 can include one or more components that support a biometric authentication system. For example, the kiosk 100 can include a camera 105 that captures images of users interacting with the kiosk 100. The captured images may be processed to identify/verify valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the camera 105 for authentication. The images captured using the camera 105 may then be used to verify/identify a pre-stored profile for the user, and the payment for the food may then be automatically deducted from an account linked to the profile. While FIG. 1 shows a single camera 105, multiple cameras may be used in some implementations. For example, two cameras each having a front end polarizer configured to pass light of a particular polarization state may be used. In such cases, even when the subject is simultaneously illuminated with lights of two different polarization states, each camera captures an image corresponding to illumination under a particular polarization state. In some implementations, a single camera 105 can have a controllable polarizer disposed in front of the camera such that the light entering the camera can be actively controlled. For example, a motor can be deployed to control the polarization angle of the camera polarizer such that the camera 105 captures an image of a subject under illumination of a first polarization state during a particular time-period, and another image of the same subject under illumination of a second polarization state during another time-period.

In some implementations, the images captured using the camera 105 can be processed using an underlying biometric authentication system to identify/verify the user. In some implementations, the biometric authentication system may extract from the images, various features—such as features derived from the face, iris, vasculature underlying the sclera of the eye, or the periocular region—to identify/verify a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

In some implementations, the kiosk 100 can include at least two illumination sources 115a and 115b (115, in general) that are spatially separated from one another by a known distance, and are configured to generate electromagnetic radiation. The illumination sources may be inherently polarized differently from one another, or be fitted with a polarizer that impart particular polarization states to the light being radiated by the corresponding sources 115. In some implementations, the polarizers disposed in front of the illumination sources 115 can be active polarizers the polarization angles of which may be controllable, for example via a motor. In such cases, the polarization states associated with the illumination sources 115 may be actively controlled, possibly in conjunction with a polarizer associated with the camera 105, such that the two illumination sources emit light that are differently polarized.

The illumination sources 115 can each include one or more light emitting diode (LED) elements 120 that may be controlled to generate electromagnetic radiation. In some implementations, the LED elements 120 can be configured to emit radiation at multiple wavelengths or wavelength ranges. The wavelength ranges can include the visible spectrum of about 400-700 nm, the NIR spectrum of about 700-1000 nm, SWIR spectrum of about 1000-1600 nm and/or near-UV wavelengths in the 320-400 nm range. While the example in FIG. 1 shows only two illumination sources 115 that are physically separated along a horizontal direction, various other configurations are also possible. For example, the illumination sources 115 may be separated along a vertical direction, and/or more than two illumination sources may be used.

Figure 2:
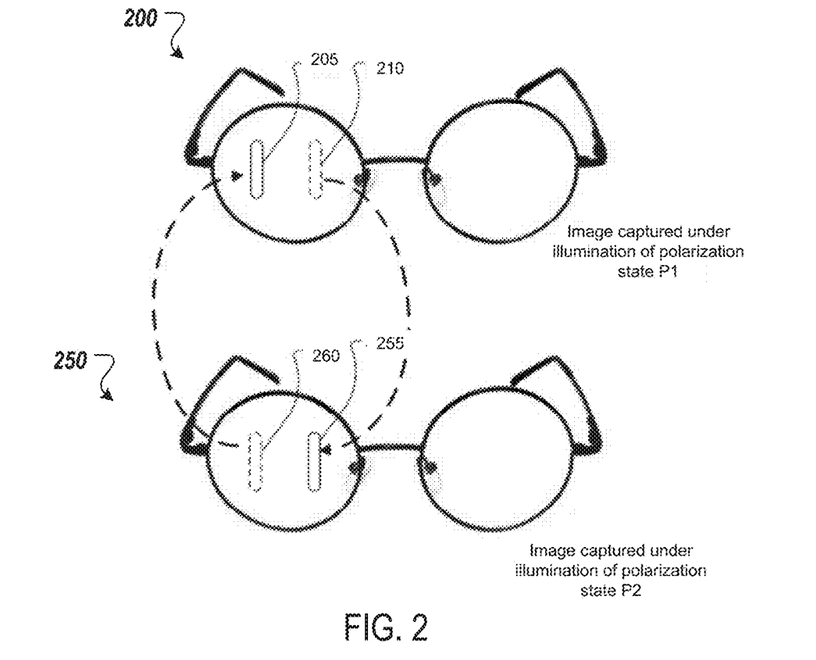
FIG. 2 is an example illustrating the removal of specular reflection from images of eyeglasses using the technology described herein.

In some implementations, reflections (e.g., specular reflections) of an illumination source from a user's eyeglasses may degrade the quality of captured images, and in turn interfere with biometric authentication processes such as those based on detecting iris patterns or eye vasculature. FIG. 2 is an example illustrating the removal of specular reflection from images of eyeglasses using the technology described herein. In this example, the upper image 200 represents an image captured under illumination of a particular polarization state (referred to herein as P1). The lower image 250 represents an image captured under illumination of another polarization state (referred to herein as P2). Because the polarization states P1 and P2 correspond to two different sources that are spatially separated, the specular reflections corresponding to the two sources appear in different portions of the corresponding images. For example, the specular reflection 205 of one source in image 200 and the specular reflection 255 of the other source in image 250 are located in different portions of the corresponding images. Therefore, if the images 200 and 250 are captured sufficiently close in time (e.g., within a time period in which the user is unlikely to change positions significantly), the specular reflection in one image can be removed, for example, by replacing the corresponding pixel values in the image with analogous pixel values from the other image. For example, the pixel values corresponding to the reflection 205 in the image 200 can be replaced by pixel values from an analogous region or portion 260 from the image 250. Similarly, the pixel values corresponding to the reflection 255 in the image 250 can be replaced by pixel values from an analogous region 210 from the image 200. This allows for generation of one or more composite images from the multiple original images. This can be done via replacing, in one image, pixel values due to specular reflection (which carries little or no meaningful information about the target) with meaningful pixel values from corresponding portions of another image. In some cases, this may improve the underlying biometric authentication process, and/or improve the appearance of the resulting image.

Figure 3:
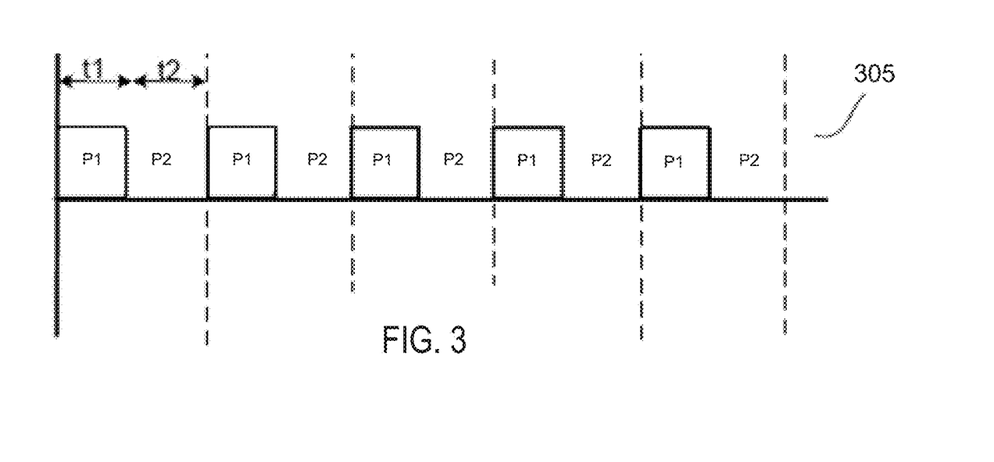
FIG. 3 shows an example scheme of illumination that may be generated using two spatially separated illumination sources.

The multiple images corresponding to different polarization states can be captured in multiple ways. In some implementations, the illumination source 115a radiates illumination of a particular polarization state (e.g., P1) during a time period that is at least partially non-overlapping with the time period during which the illumination source 115b radiates illumination at another polarization states P2. FIG. 3 shows an example set of two illumination sequences that may be generated using the two spatially separated illumination sources. Specifically, the illumination source 115a radiates illumination with polarization state P1 during the time period t1 and the illumination source 115b radiates illumination with polarization state P2 during the time period t2. This can then be repeated as shown in FIG. 3. While the examples in FIG. 3 represents the time periods t1 and t2 to be substantially equal to each other, the bit durations may also be different from one another. The duration of the time periods t1, t2 can be selected based on particular applications and/or the hardware capabilities. In some implementations, two cameras with corresponding front end polarizers can be deployed to capture images during the time period t1 and t2, respectively. In some implementations, an active polarizer disposed in front of a single camera may be adjusted such that the camera captures an image under P1 polarization state during t1, and another image under P2 polarization state during t2.

In some implementations, the illumination sources 115a and 115b may radiate illumination of different polarization states substantially concurrently. In such cases, the multiple images corresponding to different polarization states can be captured either using multiple cameras, or by adjusting an active polarizer associated with a single camera. For example, if the two illuminations sources 115a and 115b are configured to radiate illumination of mutually orthogonal polarization states concurrently, an active polarizer of a camera can be adjusted such that illumination of polarization state P1 reaches the camera sensors during t1 (while polarization state P2 is blocked out), and illumination of polarization state P2 reaches the camera sensors during t2 (while polarization state P1 is blocked out). While the concepts are illustrated using only two polarization states, higher number of polarization states (and correspondingly captured images) can be used without deviating from the scope of this disclosure. For example, each of multiple illumination sources and the camera(s) can include corresponding active polarizers that are controllable, for example, using a motor. The active polarizers can be controlled in conjunction with one another such that the spatially separated light sources radiate light of different polarization states (either concurrently or sequentially), and correspondingly the camera(s) capture the multiple images that correspond to illumination od individual polarization states. Either linear or circular polarizers can be used for implementing the technology described herein.

In some implementations, the illumination sources 115a and 115b may radiate illumination of different wavelengths. In some implementations, the illumination sources 115 can be multispectral sources (e.g., multispectral LEDs) that can be controlled to radiate lights of different wavelengths. In some implementations, the wavelengths of the illumination sources 115 can be controlled in conjunction with the corresponding polarization states to generate the composite images in accordance with technology described herein. In some implementations, at least one of the illumination sources 115 can be adjusted based on an estimate of a strength of reflection associated with the reflection of the corresponding source on the subject. The strength of reflection can be estimated, for example, based on pixel values in the corresponding portions of the image. For example, a high average pixel value over the portions representing a reflection can indicate a strong reflection and vice versa. In some implementations, the wavelength associated with a source can be varied such that that the strength of reflection is reduced. In some implementations, the polarization state (e.g., angle of polarization) of a polarizer 420 may be varied based on an estimated strength of a corresponding reflection.

Figure 4:
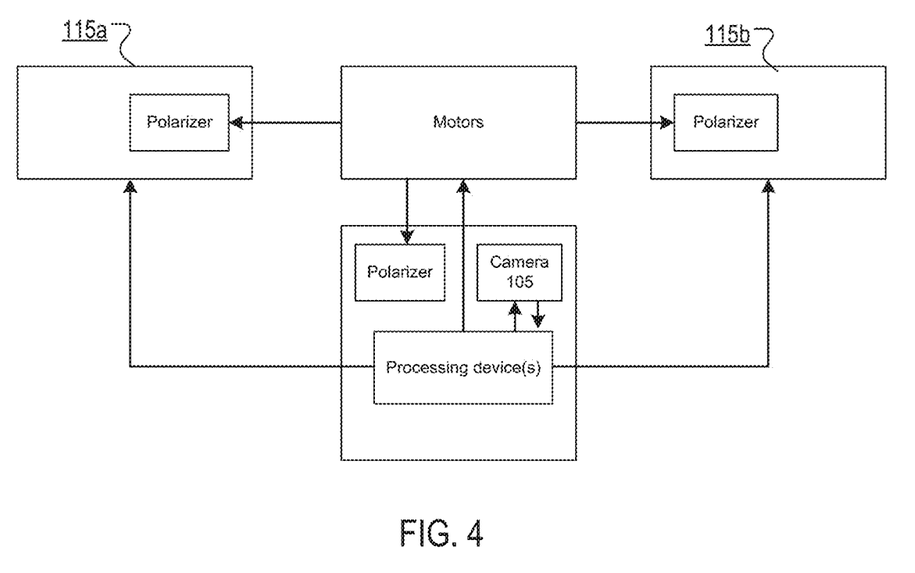
FIG. 4 shows an example of a system that can be used to implement the technology described herein.

FIG. 4 shows an example of a system 400 that can be used to implement the technology described herein. At least a portion of the system 400 can be implemented as a portion of a kiosk 100, as described above with reference to FIG. 1. For example, the system 400 can include one or more illumination sources 115a, 115b etc. (115, in general), and one or more cameras 105, substantially similar to those described above. In some implementations, the system 400 includes an image capture engine 405 that controls and coordinates the operations of the one more illumination sources 115 and the cameras 105 in accordance with technology described herein. The image capture engine 405 can include one or more processing devices 415 that control one or more components of the system 400. For example, the one or more processing devices 415 of the image capture engine 405 can be used to control the camera 105, as well as one or more motors 410 that adjusts one or more polarizers 420a, 420b, 420c, etc. (420 in general). In some implementations, the motors 410 are in communication with polarizers 420a and 420b associated with the illumination sources 115a and 115b, respectively.

The one or more processing devices 415 of the image capture engine 405 can be configured to control the motors to adjust the polarizers 420a and 420b such that the corresponding illuminations sources 115 radiate light with different polarizations. The motors 410 can also be configured to control a polarizer 420c associated with the camera 105 such that the camera 105 can be selectively used to capture images under illumination of a particular polarization state. For example, if the illumination sources 115a and 115b are configured to radiate light with illumination states P1 and P2, respectively, the polarizer 420c may be controlled by the motors 410 such that the camera sequentially captures (i) a first image substantially under illumination of P1 polarization state (while blocking illumination of the P2 polarization state), and (ii) a second image substantially under illumination of P2 polarization state (while blocking illumination of the P2 polarization state). In some implementations, the polarization states of the polarizers 420a and 420b can be varied (while keeping them different with respect to one another), and the polarizer 420c can be adjusted accordingly to facilitate capturing corresponding images. In some implementations, the angle of polarization state in the polarizer 420c may be varied, for example, based on an estimated strength of reflection in the captured video feed from the camera in 105. The strength of reflection can be estimated, for example, based on pixel values in the corresponding portions of the image. For example, a high average pixel value over the portions representing a reflection can indicate a strong reflection and vice versa. In some implementations, the polarization state (e.g., an angle of polarization) can be varied such that that the strength of reflection is reduced.

Figure 5:
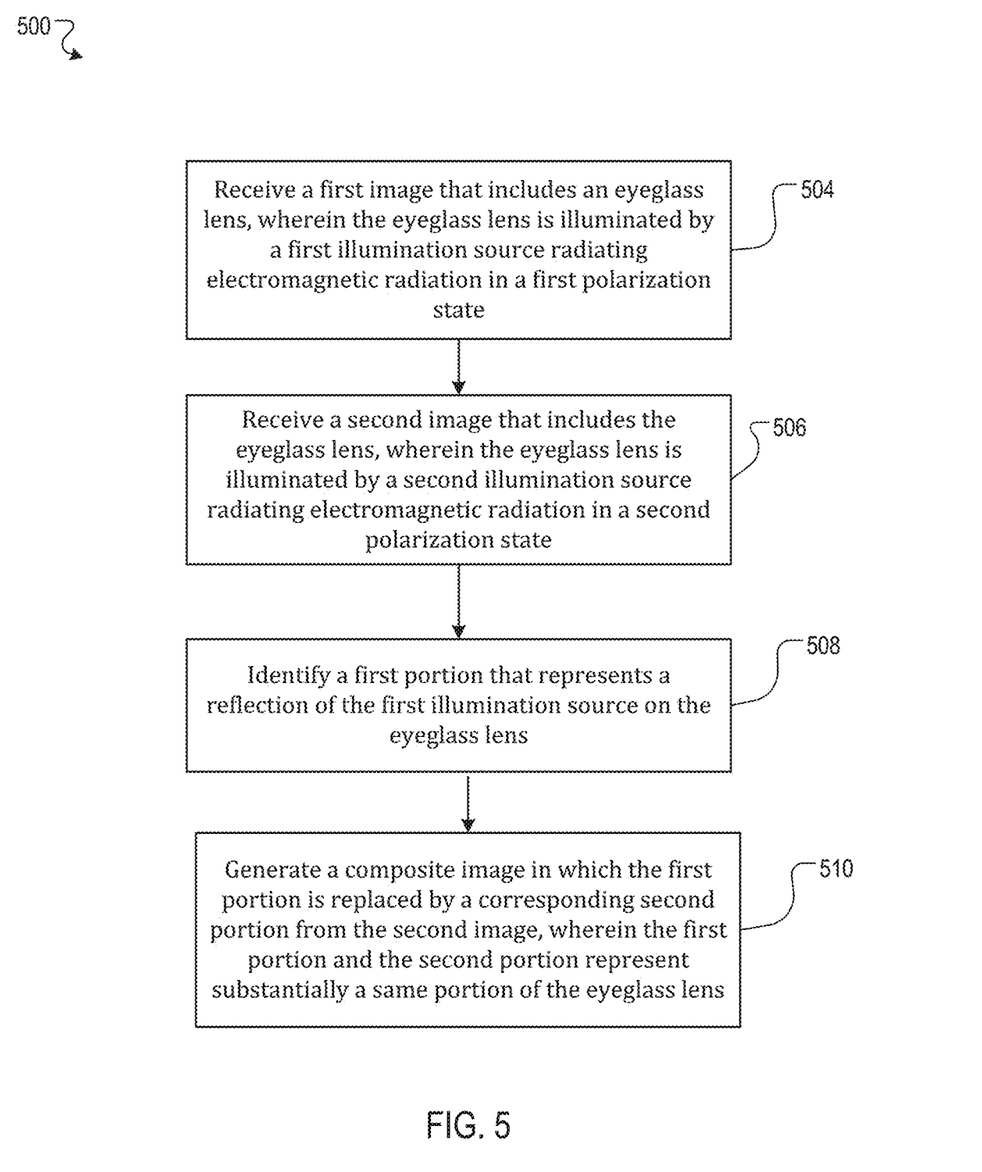
FIG. 5 is a flowchart of an example process for generating a composite image in accordance with technology described herein.

FIG. 5 is a flowchart of an example process 500 for generating a composite image in accordance with technology described herein. In some implementations, at least a portion of the process 500 may be executed by one or more processing devices disposed within a kiosk such as the kiosk 100 described with reference to FIG. 1. In some implementations, at least a portion of the process 500 may be executed at one or more servers (such as servers or computing devices in a distributed computing system) in communication with remote components such as one or more processing devices disposed within a kiosk. In some implementations, at least a portion of the process 500 can be executed by the one or more processing devices 415 of the image capture engine 405.

Operations of the process 500 includes receiving a first image that includes an eyeglass lens, wherein the eyeglass lens is illuminated by a first illumination source radiating electromagnetic radiation in a first polarization state (510). Operations of the process 500 also includes receiving a second image that includes the eyeglass lens, wherein the eyeglass lens is illuminated by a second illumination source radiating electromagnetic radiation in a second polarization state (520). The second polarization state is different from the first polarization state. For example, the first and second polarization states can be substantially orthogonal to one another. The second illumination source is spatially separated from the first illumination source.

In some implementations, the first and second images are captured using a single camera during two time periods that are at least partially non-overlapping. In some implementations, the first and second images are captured substantially concurrently with at least two cameras each of which allows the reflected light corresponding to one polarization to pass while substantially blocking the reflected light corresponding to the other polarization state. In some implementations, the first illumination source radiates the electromagnetic radiation in the first polarization state during a first time period, and the second illumination source radiates the electromagnetic radiation in the second polarization state during a second time period that is at least partially non-overlapping with the first time period.

Operations of the process 500 also includes identifying, in the first image, a first portion that represents a reflection of the first illumination source on the eyeglass lens (530) and generating a composite image in which the first portion is replaced by a corresponding second portion from the second image (540). The first portion and the second portion represent substantially a same portion of the eyeglass lens. For example, the polarization states of the first illumination source and the second illumination source may be controlled such that specular reflections of the sources on the lenses are at different locations. This can include, for example, controlling at least one of (i) a first polarizer disposed at the first illumination source and (ii) a second polarizer disposed at the second illumination source such that the reflection of the first illumination source on the eyeglass lens and a reflection of the second illumination source on the eyeglass lens are at different locations. In some implementations, generating the composite image can include identifying, in the second image, a particular portion that represents a reflection of the second illumination source on the eyeglass lens, and generating the composite image by replacing pixel values corresponding to the particular portion of the second image by pixel values in a corresponding portion from the first image. The portions replaced by one another represent substantially a same portion of the imaged subject (e.g., same portions of the eyeglass lens on which the specular reflections are visible). The composite images can then be used in a biometric authentication process such as ones based on analyzing irises, eyeprints, or other facial features.

Figure 6:
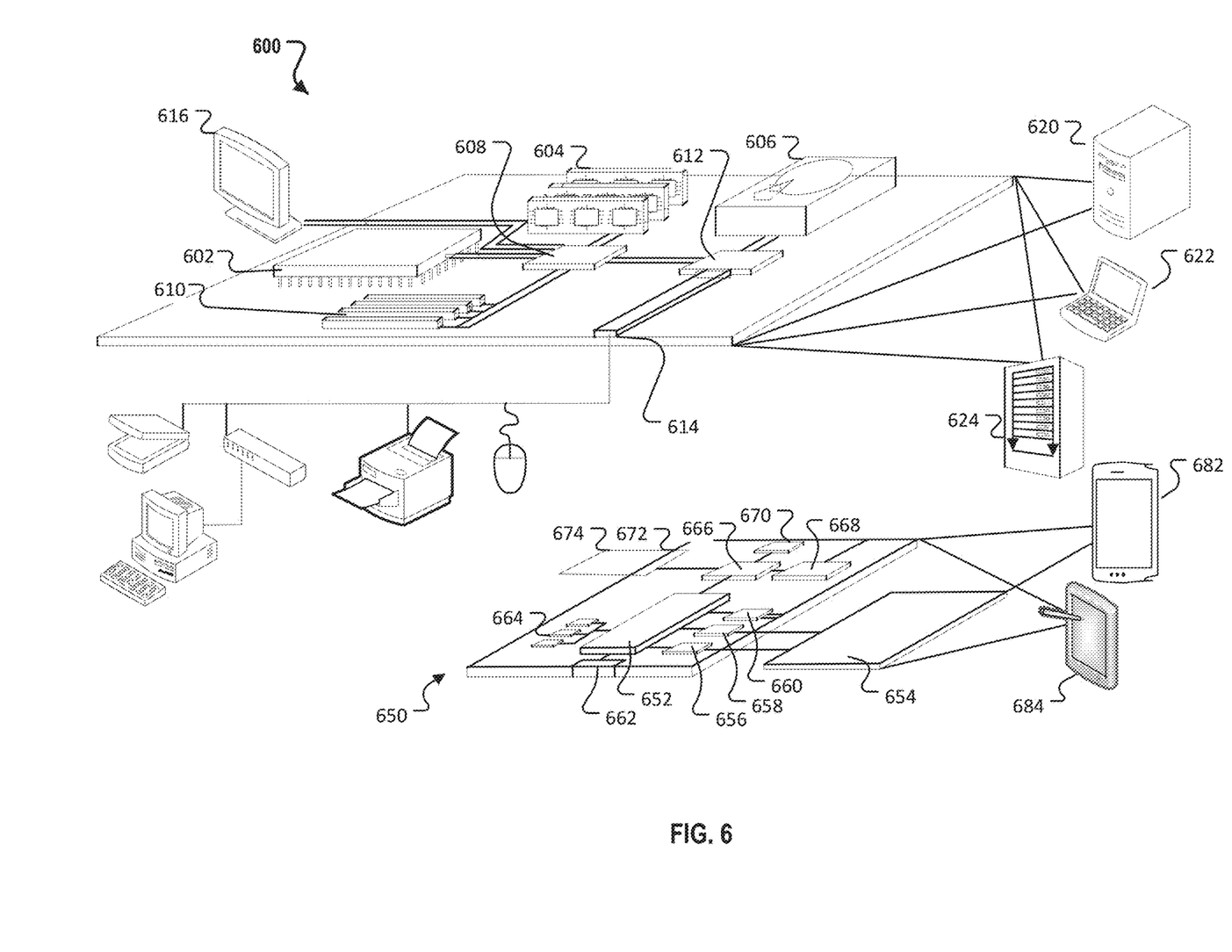
FIG. 6 is a block diagram representing examples of computing devices.

FIG. 6 shows an example of a computing device 600 and a mobile device 650, which may be used with the techniques described here. For example, referring to FIG. 1, the kiosk device 100 can include one or more of the computing device 600 or the mobile device 650, either in part or in its entirety. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine, in other cases, multiple engines can be installed and running on the same computer or computers.

Although a few implementations have been described in detail above, other modifications may be made without departing from the scope of the inventive concepts described herein, and, accordingly, other implementations are within the scope of the following claims.

What is claimed is:

1. A method for generating a composite image from multiple images, the method comprising:
   receiving, by one or more processing devices, a first image that includes an eyeglass lens, wherein the eyeglass lens is illuminated by a first illumination source radiating electromagnetic radiation in a first polarization state;
   receiving, by the one or more processing devices, a second image that includes the eyeglass lens, wherein the eyeglass lens is illuminated by a second illumination source radiating electromagnetic radiation in a second polarization state, wherein:
      the second polarization state is different from the first polarization state, and
      the second illumination source is spatially separated from the first illumination source;
   identifying, by the one or more processing devices in the first image, a first portion that represents a reflection of the first illumination source on the eyeglass lens;
   identifying, by the one or more processing devices in the second image, a second portion corresponding to the first portion of the first image, wherein:
      the second portion does not represent a reflection of the second illumination source on the eyeglass lens, and
      the first portion and the second portion represent a same portion of the eyeglass lens; and
   generating, by the one or more processing devices, the composite image in which the first portion is replaced by the corresponding second portion from the second image.

2. The method of claim 1, wherein the first illumination source radiates the electromagnetic radiation in the first polarization state during a first time period, and the second illumination source radiates the electromagnetic radiation in the second polarization state during a second time period that is at least partially non-overlapping with the first time period.

3. The method of claim 1, wherein the first polarization state is orthogonal to the second polarization state.

4. The method of claim 1, further comprising performing a biometric authentication based on the composite image.

5. The method of claim 1, further comprising:
   identifying, in the second image, a third portion that represents the reflection of the second illumination source on the eyeglass lens; and
   generating, by the one or more processing devices, a second composite image in which the third portion is replaced by a corresponding fourth portion from the first image, wherein the third portion and the fourth portion represent a same portion of the eyeglass lens.

6. The method of claim 1, further comprising controlling at least one of: (i) a first polarizer disposed at the first illumination source and (ii) a second polarizer disposed at the second illumination source such that the reflection of the first illumination source on the eyeglass lens and the reflection of the second illumination source on the eyeglass lens are at different locations.

7. The method of claim 1, wherein at least one of (i) the first polarization state and (ii) the second polarization state is adjusted based on an estimate of a strength of reflection associated with the reflection of the first illumination source on the eyeglass lens.

8. The method of claim 1, wherein a wavelength associated with at least one of (i) the first illumination source and (ii) the second illumination source is adjusted based on an estimate of a strength of reflection associated with the reflection of the first illumination source on the eyeglass lens.

9. An imaging system comprising:
   a first illumination source controllable to radiate electromagnetic radiation of multiple polarization states;
   a second illumination source disposed spatially separated from the first illumination source, the second illumination source controllable to radiate electromagnetic radiation of multiple polarization states; and
   one or more processing devices that:
      receive a first image including a subject captured under illumination by the first illumination source radiating electromagnetic radiation in a first polarization state,
      receive a second image including the subject under illumination by the second illumination source radiating electromagnetic radiation in a second polarization state different from the first polarization state,
      identify, in the first image, a first portion that represents a reflection of the first illumination source,
      identify, in the second image, a second portion corresponding to the first portion of the first image, wherein:
         the second portion does not represent a reflection of the second illumination source on the subject, and
         the first portion and the second portion represent a same portion of the subject; and generate a composite image in which the first portion is replaced by the corresponding second portion from the second image.

10. The imaging system of claim 9, wherein the first illumination source radiates the electromagnetic radiation in the first polarization state during a first time period, and the second illumination source radiates the electromagnetic radiation in the second polarization state during a second time period that is at least partially non-overlapping with the first time period.

11. The imaging system of claim 9, wherein the first polarization state is orthogonal to the second polarization state.

12. The imaging system of claim 9, further comprising at least one camera that captures the first and second images.

13. The imaging system of claim 9, further comprising an authentication engine that processes the composite image to perform a biometric authentication process to regulate access to a secure system.

14. The imaging system of claim 9, wherein the one or more processing devices are configured to:
identify, in the second image, a third portion that represents the reflection of the second illumination source; and
generate a second composite image in which the third portion is replaced by a corresponding fourth portion from the first image, wherein the third portion and the fourth portion represent a same portion of the subject.

15. The imaging system of claim 9, further comprising:
at least one of: (i) a first polarizer disposed at the first illumination source and (ii) a second polarizer disposed at the second illumination source.

16. The imaging system of claim 15, further comprising at least one motor that controls one or more of the first and second polarizers such that the reflection of the first illumination source on the subject and the reflection of the second illumination source on the subject are at different locations.

17. The imaging system of claim 9, wherein at least one of (i) the first polarization state and (ii) the second polarization state is adjusted based on an estimate of a strength of reflection associated with the reflection of the first illumination source.

18. The imaging system of claim 9, wherein at least one of (i) the first illumination source and (ii) the second illumination source is a multispectral source controllable to radiate illumination at multiple different wavelengths.

19. The imaging system of claim 18, wherein a wavelength associated with at least one of (i) the first illumination source and (ii) the second illumination source is adjusted based on an estimate of a strength of reflection associated with the reflection of the first illumination source.

20. One or more non-transitory machine-readable storage devices having encoded thereon computer readable instructions for causing one or more processing devices to perform operations comprising:
receiving a first image that includes an eyeglass lens, wherein the eyeglass lens is illuminated by a first illumination source radiating electromagnetic radiation in a first polarization state;
receiving a second image that includes the eyeglass lens, wherein the eyeglass lens is illuminated by a second illumination source radiating electromagnetic radiation in a second polarization state, wherein:
the second polarization state is different from the first polarization state, and
the second illumination source is spatially separated from the first illumination source;
identifying, in the first image, a first portion that represents a reflection of the first illumination source on the eyeglass lens;
identifying, in the second image, a second portion corresponding to the first portion of the first image, wherein:
the second portion does not represent a reflection of the second illumination source on the eyeglass lens, and
the first portion and the second portion represent a same portion of the eyeglass lens; and
generating a composite image in which the first portion is replaced by the corresponding second portion from the second image.

* * * * *